(12) United States Patent
Kaneta et al.

(10) Patent No.: US 10,081,878 B2
(45) Date of Patent: Sep. 25, 2018

(54) COATED STAINLESS STEEL MEMBER

(71) Applicant: HONDA MOTOR CO., LTD., Tokyo (JP)

(72) Inventors: Mitsutada Kaneta, Urayasu (JP); Yasuhiro Arai, Chiba (JP); Manabu Inoue, Tokyo (JP); Tsutomu Miyadera, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/191,279

(22) Filed: Jun. 23, 2016

(65) Prior Publication Data

US 2016/0305033 A1    Oct. 20, 2016

Related U.S. Application Data

(62) Division of application No. 13/906,793, filed on May 31, 2013, now abandoned.

(30) Foreign Application Priority Data

Jun. 8, 2012  (JP) ................................ 2012-130937

(51) Int. Cl.
| | |
|---|---|
| C25D 13/14 | (2006.01) |
| C25D 13/20 | (2006.01) |
| C25D 5/48 | (2006.01) |
| F16L 9/02 | (2006.01) |
| C25D 3/12 | (2006.01) |
| C25D 7/04 | (2006.01) |
| C25D 5/44 | (2006.01) |
| B60K 15/04 | (2006.01) |
| C25D 5/36 | (2006.01) |
| C25D 13/22 | (2006.01) |
| B60K 15/01 | (2006.01) |
| C23C 28/00 | (2006.01) |
| F16L 9/147 | (2006.01) |
| F16L 58/08 | (2006.01) |
| C09D 5/44 | (2006.01) |

(52) U.S. Cl.
CPC ................ *C25D 5/48* (2013.01); *B60K 15/01* (2013.01); *B60K 15/04* (2013.01); *C09D 5/44* (2013.01); *C23C 28/00* (2013.01); *C23C 28/322* (2013.01); *C23C 28/345* (2013.01); *C25D 3/12* (2013.01); *C25D 5/36* (2013.01); *C25D 7/04* (2013.01); *C25D 13/14* (2013.01); *C25D 13/20* (2013.01); *C25D 13/22* (2013.01); *F16L 9/02* (2013.01); *F16L 9/147* (2013.01); *F16L 58/08* (2013.01); *B60K 2015/047* (2013.01)

(58) Field of Classification Search
None
See application file for complete search history.

(56) References Cited

U.S. PATENT DOCUMENTS

| | | | |
|---|---|---|---|
| 3,645,861 A | 2/1972 | Garvey | |
| 6,090,254 A * | 7/2000 | Sobata | .................... C23C 22/00 204/471 |
| 2002/0100168 A1* | 8/2002 | Yoshida | ................. B60K 15/04 29/890.14 |
| 2003/0183626 A1* | 10/2003 | Tomimura | ............. B60K 15/03 220/4.14 |
| 2004/0148755 A1 | 8/2004 | Morinaga et al. | |
| 2005/0194049 A1 | 9/2005 | Yoshida et al. | |

FOREIGN PATENT DOCUMENTS

| | | |
|---|---|---|
| EP | 0564287 A2 | 10/1993 |
| JP | 62-33797 A | 2/1987 |
| JP | 63-192877 A | 8/1988 |
| JP | 09-143791 A | 6/1997 |
| JP | 09-268398 A | 10/1997 |
| JP | 2000-212799 * | 8/2000 |
| JP | 2000-212799 A | 8/2000 |
| JP | 2002-242779 A | 8/2002 |
| JP | 2003-277992 A | 10/2003 |
| JP | 2004-230419 A | 8/2004 |
| JP | 2005-144895 A | 6/2005 |
| JP | 2005-206064 A | 8/2005 |
| JP | 2006-231207 A | 9/2006 |
| JP | 2007-113080 A | 5/2007 |
| WO | 2011-113139 A1 | 9/2011 |

OTHER PUBLICATIONS

Japanese Office Action dated May 7, 2014, issued in corresponding Japanese Patent Application No. 2012-130937, (3 pages).

* cited by examiner

*Primary Examiner* — Kishor Mayekar
(74) *Attorney, Agent, or Firm* — Westerman, Hattori, Daniels & Adrian, LLP

(57) ABSTRACT

The present invention provides a method for producing a coated stainless steel member, comprising: performing Wood's strike nickel plating on a stainless steel substrate, and then performing cationic electrodeposition on a formed Wood's strike nickel plating layer.

5 Claims, No Drawings

COATED STAINLESS STEEL MEMBER

This application is a divisional application of U.S. patent application Ser. No. 13/906,793 filed May 31, 2013, and is based upon and claims the benefits of the priority from Japanese Patent Application No. 2012-130937 filed on Jun. 8, 2012, the entire contents of which being incorporated herein by reference.

BACKGROUND OF THE INVENTION

Field of the Invention

The present invention relates to a coated stainless steel member, and more specifically a stainless steel member having a coating excellent in adhesion and corrosion prevention. In particular, the present invention relates to a stainless steel fuel inlet pipe (FIP) for an automobile fuel tank.

Brief Description of the Related Art

In one kind of the conventionally known methods for coating a stainless steel member, strike nickel plating is performed on a stainless steel substrate. For example, several methods are known such as a method including Wood's strike nickel plating, a subsequent chromate treatment and phosphate treatment, and spray coating (Japanese Patent Application Publication No. Sho 63-192877); a method including strike nickel plating, subsequent nickel plating, and coating (Japanese Patent Application Publication No. Hei 9-268398 and Japanese Patent Application Publication No. 2005-144895), and a method including Wood's strike nickel plating, and subsequent coating by forming a thin polymer film by reduction-electrolytic polymerization (Japanese Patent Application Publication No. 2000-212799). However, in any of these methods, coating is performed on a strike nickel plating after a treatment for improving the adhesion is performed on the strike nickel plating. This is because of the conventional recognition that "a coating film easily peels off when coating is performed directly on a nickel strike plating" (in Lower Left column on Page 2 of Japanese Patent Application Publication No. Sho 63-192877).

In general, for coating a material with good adhesion, a pre-coating surface treatment such as a zinc phosphate treatment, a chromate treatment, or a zirconium treatment is carried out. When the material is made of iron or aluminum, a chemical conversion film is formed by a reaction (dissolution and deposition) between the material and a surface treatment liquid. The coating adhesion with the material is secured by hydrogen bonding or an anchor effect caused by the chemical conversion film. However, in a case of coating on stainless steel, a surface treatment film such as a zinc phosphate film formed for enhancing the coating adhesion cannot be formed, and hence a sufficient coating adhesion cannot be obtained, because a stable oxide film is formed on a surface of the stainless steel. For this reason, peeling and corrosion occur in a secondary adhesion test for hot-salt water resistance or a chipping test. As shown in Japanese Patent Application Publication No. 2006-231207, thick coating in a thickness of 150 to 400 µm has been attempted for improvement in chipping resistance, prevention of permeation of salt water, and improvement in adhesion. However, such a method is not economical.

In the Meantime, in areas heavily inflicted with salt injury due to sea-shore salt or snow melting salt spread in a large amount, stainless steel FIPs have been used instead of conventional iron FIPs. However, even in the case of stainless steel FIPs, the corrosion resistance is insufficient at welded portions and the like. Hence, electrodeposition coating as shown in Japanese Patent Application Publication No. 2002-242779 has been carried out. The coating is conducted by other methods such as cationic electrodeposition coating or hexavalent chromium-free water-soluble acrylic-based silicone coating shown in Japanese Patent Application Publication No. 2004-230419, and coating using an acrylic paint, an alkyd paint, a urethane paint, an epoxide paint, or the like in the form of a cationic aqueous solution or emulsion shown in Japanese Patent Application Publication No. 2005-206064. However, it is difficult to perform electrodeposition excellent in adhesion and corrosion prevention on a stainless steel substrate, as described above.

SUMMARY OF THE INVENTION

An object of the present invention is to provide a coating method capable of performing coating excellent in adhesion and corrosion resistance on a stainless steel substrate by an economical and simple process. The coating method makes it possible to obtain sufficient coating adhesion and sufficient corrosion resistance even with a thin film coating of 25 to 30 µm, for example. Another object of the present invention is to provide a coated stainless steel member being chromium-free and having high corrosion resistance, and in particular, a coated stainless steel FIP.

The present inventors have conducted earnest study to achieve the above objects. As a result, the present inventors have found the following fact. Specifically, by performing Wood's strike nickel plating excellent in adhesion to stainless steel on a stainless steel member, a hard oxide film formed on the stainless steel can be removed, and reformation of the oxide film can be prevented. Subsequently, cationic electrodeposition is performed on such a Wood's strike nickel plating film. In this manner, extremely excellent adhesion between the cationic electrodeposition and the Wood's strike nickel plating can be achieved without forming any film for improving coating film adhesion, and sufficient coating adhesion and corrosion resistance can be obtained on a stainless steel substrate by thin film coating. This finding has led to the completion of the present invention. Specifically, the present invention provides a coated stainless steel member comprising: a stainless steel substrate; and a Wood's strike nickel plating layer and a cationic electrodeposition coating layer which are stacked in this order on the stainless steel substrate.

Moreover, the present invention provides a method for producing a coated stainless steel member, the method comprising: performing Wood's strike nickel plating on a stainless steel substrate; and then performing cationic electrodeposition coating on a formed Wood's strike nickel plating layer.

In a case of coating on stainless steel, the present invention makes it possible to obtain sufficient coating adhesion and corrosion resistance with a thin film coating of 25 to 30 µm.

DESCRIPTION OF THE PREFERRED EMBODIMENTS

A method for producing a coated stainless steel member of the present invention comprises: performing Wood's strike nickel plating on a stainless steel substrate; and then performing cationic electrodeposition on a formed Wood's strike nickel plating layer. The method of the present invention makes it possible to provide a coated stainless steel member comprising: a stainless steel substrate; and a Wood's strike nickel plating layer and a cationic electrodeposition coating layer which are stacked in this order on the stainless steel substrate.

As for a basic bath composition for the Wood's strike nickel plating used in the present invention, a known Wood's strike nickel plating bath can be used, and the bath is composed of nickel chloride and hydrochloric acid. The concentration of nickel chloride in the bath is preferably 200 to 300 g/L, and more preferably 220 to 240 g/L. Meanwhile, the concentration of hydrochloric acid (35% aqueous hydrogen chloride solution) in the bath is preferably 100 ml/L to 300 ml/L, and more preferably 125 to 230 ml/L. In addition, boric acid serving as a buffering agent and an anti-mist agent can also be added to the Wood's strike nickel plating bath. The concentration of boric acid in the bath is, for example, 10 to g/L, and preferably 25 to 35 g/L. Meanwhile, the concentration of the anti-mist agent in the bath is, for example, 0.1 to 10 g/L, and preferably 0.5 to 3 g/L. Moreover, the kind of the anti-mist agent is not limited, and an example thereof is DS-55 (manufactured by DIPSOL CHEMICALS Co., Ltd.). The pH of the Wood's strike nickel plating bath is generally 1 or lower.

The temperature at which the Wood's strike nickel plating is performed by using the Wood's strike nickel plating bath may be normal temperature, and preferably 20° C. to 60° C., and more preferably 40 to 50° C. The cathode current density for performing the plating is, for example, 0.5 A/dm$^2$ or higher, preferably 1 to 10 A/dm$^2$, and more preferably 3 to 8 A/dm$^2$. The time for which the plating is performed is preferably set so that the product of the plating time and the cathode current density can be 100 (second×A/dm$^2$) or larger. The product is more preferably 150 to 1000 (second× A/dm$^2$). The thickness of a nickel plating film obtained under such plating conditions is generally in the range from 0.005 to 0.3 μm, and preferably from 0.02 to 0.25.

Cationic electrodeposition is performed on the Wood's strike nickel plating layer. As the cationic electrodeposition, a known cationic electrodeposition can be employed. For example, a stainless steel member subjected to the Wood's strike nickel plating is immersed in a cationic electrodeposition paint composed of a resin, a pigment, and the like, which meet the purpose of the coating. An article to be coated is used as a cathode (−), and an electrode plate set in a diaphragm chamber in an electrodeposition tank is used as an anode (+). A direct current is applied across the cathode (−) and the anode (+), so that a coating film is deposited on the article to be coated. After that, a water-washing step is conducted. Then, the deposited coating film is dried and cured by baking in a baking furnace. Thus, a coating film excellent in adhesion to the stainless steel can be obtained. Examples of the cationic electrodeposition paint include acrylic paints, alkyd paints, urethane paints, epoxy paints, and the like. The paints are provided as cationic aqueous solutions or emulsions.

In the method for producing a coated stainless steel member of the present invention, the Wood's strike nickel plating layer may be subjected to a zinc phosphate treatment, before the cationic electrodeposition is performed. This makes it possible to prevent decrease in adhesion of the coating due to an electric corrosion reaction caused by contact with other metal. As the zinc phosphate treatment, known zinc phosphate treatments used for ordinary coating can be used as they are.

In the method for producing a coated stainless steel member of the present invention, it is preferable to degrease the stainless steel substrate, before the Wood's strike nickel plating is performed on the stainless steel substrate. By removing oil on the stainless steel, the effect of the Wood's strike nickel plating layer can be exerted more efficiently. As a degreasing agent and a degreasing method employed in the present invention, any known degreasing agent and any known degreasing method can be employed as appropriate. Examples of the degreasing agent include alkaline immersion degreasing agents, alkaline electrolysis degreasing agents, acidic emulsion degreasing agents, solvent cleaning agents, and the like. However, the degreasing agent is not limited thereto. Preferably, an alkaline cathode electrolysis degreasing agent is used. As the degreasing method, for example, an electrolysis immersion treatment is conducted generally at 30 to 55° C. for about several minutes. If needed, a preliminary degreasing treatment can also be conducted before the degreasing treatment.

The present invention is applicable to stainless steel members required to have high corrosion resistance. In particular, the present invention is preferable for a stainless steel fuel inlet pipe for an automobile fuel tank.

Next, the present invention is described while showing Examples and Comparative Examples.

EXAMPLES

The present invention will be described in detail below with reference to the following non-limiting Examples and Comparative examples. It will be apparent to those skilled in the art that many changes can be made in the embodiments described without departing from the scope of the present invention.

Examples 1 to 5

By using 50 g/L of a degreasing agent HD-37 (manufactured by DIPSOL CHEMICALS Co., Ltd.), an SUS436 panel (50 mm×100 mm×0.3 mm in thickness) is subjected to cathode electrolysis degreasing under conditions of 50° C., 10 minutes, and a cathode current density of 1 A/dm$^2$. Subsequently, the panel was washed with water. After that, Wood's strike nickel plating was performed (40° C.) under plating conditions shown in Table 1 by using a bath having the following composition.

| | |
|---|---|
| Nickel chloride (NiCl$_2$) | 220 g/L |
| 35% hydrochloric acid (HCl) | 230 ml/L |
| Boric acid (H$_3$BO$_3$) | 30 g/L |
| DS-55 (manufactured by DIPSOL CHEMICALS Co., Ltd.) | 1 ml/L |

After that, the panel was washed with water, and subjected to cationic electrodeposition (25 to 30 μm) in a usual manner, by using an electrodeposition paint CFA 590-034 manufactured by PPG. After washed with water, the panel was baked and dried at 200° C. for 25 minutes. The obtained coated panel was immersed in 5% aqueous sodium chloride at 55° C. for 240 hours, and the coating adhesion was evaluated. Table 1 shows the results.

TABLE 1

Plating Conditions and Results of Evaluation of Coating Adhesion

| Plating conditions | Current density (A/dm$^2$) | Plating time (second) | Coating adhesion Maximum peeling width, both sides (mm) |
|---|---|---|---|
| Example 1 | 1 | 180 | 2.0 to 5.0 |
| Example 2 | 3 | 60 | 2.0 to 4.0 |
| Example 3 | 5 | 30 | 2.0 to 4.0 |
| Example 4 | 5 | 90 | 1.0 to 3.0 |
| Example 5 | 5 | 180 | 1.0 to 2.0 |

*The evaluation was made based on the maximum peeling width between both sides (5 mm or less is desirable).

Example 6

By using 50 g/L of a degreasing agent HD-37 (manufactured by DIPSOL CHEMICALS Co., Ltd.), an SUS436 panel (50 mm×100 mm×0.3 mm in thickness) was subjected to cathode electrolysis degreasing under conditions of 50° C., 10 minutes, and a cathode current density of 1 A/dm$^2$. Subsequently, the panel was washed with water. After that, Wood's strike nickel plating was performed (40° C.) under plating conditions shown in Table 2 by using a bath having the following composition.

| Nickel chloride (NiCl$_2$) | 220 g/L |
|---|---|
| 35% hydrochloric acid (HCl) | 230 ml/L |
| Boric acid (H$_3$BO$_3$) | 30 g/L |
| DS-55 (manufactured by DIPSOL CHEMICALS Co., Ltd.) | 1 ml/L |

After that, the panel was washed with water, and subjected to cationic electrodeposition (25 to 30 μm) in a usual manner, by using an electrodeposition paint CFA 590-034 manufactured by PPG. After being washed with water, the panel was baked and dried at 200° C. for 25 minutes. The obtained coated panel was immersed in 5% aqueous sodium chloride at 55° C. for 240 hours, and the coating adhesion was evaluated. Table 2 shows the results.

Comparative Example 1

By using 50 g/L of a degreasing agent HD-37 (manufactured by DIPSOL CHEMICALS Co., Ltd.), an SUS436 panel (50 mm×100 mm×0.3 mm in thickness) was subjected to cathode electrolysis degreasing under conditions of 50° C., 10 minutes, and a cathode current density of 1 A/dm$^2$. Subsequently, the panel was washed with water. After that, the panel was subjected to cationic electrodeposition (25 to 30 μm) in a usual manner, by using an electrodeposition paint CFA 590-034 manufactured by PPG.

After being washed with water, the panel was baked and dried at 200° C. for 25 minutes. The obtained coated panel was immersed in 5% aqueous sodium chloride at 55° C. for 240 hours, and the coating adhesion was evaluated. Table 2 shows the results.

Comparative Example 2

By using 50 g/L of a degreasing agent HD-37 (manufactured by DIPSOL CHEMICALS Co., Ltd.), a SUS436 panel (50 mm×100 mm×0.3 mm in thickness) was subjected to cathode electrolysis degreasing under conditions of 50° C., 10 minutes, and a cathode current density of 1 A/dm$^2$. Subsequently, the panel was washed with water. After that, an acid electrolysis treatment was conducted (60° C.) by using sulfuric acid (120 ml/L) at a cathode current density of 1 A/dm$^2$ for 4 minutes. After that, the panel was washed with water, and subjected to cationic electrodeposition (25 to 30 μm) in a usual manner by using an electrodeposition paint CFA 590-034 manufactured by PPG. After being washed with water, the panel was baked and dried at 200° C. for 25 minutes. The obtained coated panel was immersed in 5% aqueous sodium chloride at 55° C. for 240 hours, and the coating adhesion was evaluated. Table 2 shows the results.

TABLE 2

Evaluation results of coating adhesion in a case where a Zn—Ni-plated bolt was fixed to each coated panel by a steel nut.

| Plating conditions | Current density (A/dm$^2$) | Plating time (second) | Coating adhesion Maximum peeling width, both sides (mm) |
|---|---|---|---|
| Example 6 | 5 | 180 | 5 |
| Comp. Ex. 1 | — | — | 10 or more |
| Comp. Ex. 2 | — | — | 10 or more |

*The evaluation was made based on the maximum peeling width between both sides (5 mm or less is desirable).

INDUSTRIAL APPLICABILITY

The present invention makes it possible to enhance coating adhesion to a stainless steel FIP, and thereby obtain corrosion resistance which meets the LEV-II regulations. In addition, since the film is chromium-free and has a high corrosion resistance, the film can be used as an environmentally friendly film in wide applications.

The invention claimed is:

1. A method for producing a coated stainless steel member, comprising:
   performing Wood's strike nickel plating on a stainless steel substrate; and then
   performing cationic electrodeposition to form a cationic electrodeposition coating layer directly on a formed Wood's strike nickel plating layer.

2. The production method according to claim 1, comprising: degreasing the stainless steel substrate;
   performing the Wood's strike nickel plating on the degreased stainless steel substrate; and
   performing the cationic electrodeposition on the formed Wood's strike nickel plating layer; followed by baking.

3. The production method according to claim 2, wherein the coated stainless steel member is a fuel inlet pipe for an automobile fuel tank.

4. The production method according to claim 1, wherein the coated stainless steel member is a fuel inlet pipe for an automobile fuel tank.

5. The production method according to claim 1, wherein the coated stainless steel member is a fuel inlet pipe for an automobile fuel tank.

* * * * *